United States Patent
Arnaud et al.

(10) Patent No.: US 10,406,728 B2
(45) Date of Patent: Sep. 10, 2019

(54) SHIM FOR A COMPRESSION MOLD WITH IMPROVED SEALING

(71) Applicant: Compagnie Plastic Omnium, Lyons (FR)

(72) Inventors: Frederic Arnaud, Bourg Argental (FR); Patrick Bosg, Saint Barthelemy de Vals (FR); Denis Gille, La Pesse (FR); Serge Monnin, Fontaine Francaise (FR); Olivier Torres, Saint-Genis Laval (FR); Jean-Yves Sozet, Vion (FR)

(73) Assignee: Compagnie Plastic Omnium, Lyons (FR)

( * ) Notice: Subject to any disclaimer, the term of this patent is extended or adjusted under 35 U.S.C. 154(b) by 790 days.

(21) Appl. No.: 14/651,339

(22) PCT Filed: Dec. 13, 2013

(86) PCT No.: PCT/FR2013/053080
§ 371 (c)(1),
(2) Date: Jun. 11, 2015

(87) PCT Pub. No.: WO2014/091175
PCT Pub. Date: Jun. 19, 2014

(65) Prior Publication Data
US 2015/0314494 A1 Nov. 5, 2015

(30) Foreign Application Priority Data
Dec. 14, 2012 (FR) .................................... 12 62102

(51) Int. Cl.
*B29C 43/36* (2006.01)
*C08L 23/06* (2006.01)
(Continued)

(52) U.S. Cl.
CPC .......... *B29C 43/36* (2013.01); *B29C 33/0038* (2013.01); *B29C 43/3607* (2013.01);
(Continued)

(58) Field of Classification Search
CPC ........................... B29C 43/36; B29C 43/3607
See application file for complete search history.

(56) References Cited

U.S. PATENT DOCUMENTS

| 7,309,221 B2 | 12/2007 | Okahara et al. |
| 8,257,823 B2 | 9/2012 | Yamasaki et al. |

(Continued)

FOREIGN PATENT DOCUMENTS

| EP | 2524796 | 11/2012 |
| EP | 2524796 A1 | 11/2012 |

(Continued)

*Primary Examiner* — Ryan M Ochylski
(74) *Attorney, Agent, or Firm* — Jacox, Meckstroth & Jenkins (57) ABSTRACT

A shim for a compression mold for manufacturing a component from reinforced plastic, typically from SMC, comprising a fixed molding element, a mobile molding element, and a mobile shim that can be moved by an actuator. The mobile shim comprises a conventional part made of steel but also a part made of a high expansion material with a mean coefficient of expansion that is high enough that its own expansion at the molding temperature places the shim in compression against the molding element and seals against this element, thus eliminating flash on the molded part. This material is advantageously a polyetheretherketone, or PEEK. A mold comprising this shim and a compression molding method are also disclosed.

24 Claims, 2 Drawing Sheets

(51) Int. Cl.
*C08L 77/06* (2006.01)
*C08K 3/40* (2006.01)
*C08K 7/06* (2006.01)
*C08K 7/14* (2006.01)
*B29C 70/46* (2006.01)
*B29C 33/00* (2006.01)
*B29C 43/38* (2006.01)
*B29K 223/00* (2006.01)
*B29K 277/00* (2006.01)
*B29K 307/04* (2006.01)
*B29K 309/08* (2006.01)
*B29C 43/32* (2006.01)

(52) U.S. Cl.
CPC .............. *B29C 43/38* (2013.01); *B29C 70/46* (2013.01); *C08K 3/40* (2013.01); *C08K 7/06* (2013.01); *C08K 7/14* (2013.01); *C08L 23/06* (2013.01); *C08L 77/06* (2013.01); *B29C 2043/3261* (2013.01); *B29K 2223/06* (2013.01); *B29K 2277/10* (2013.01); *B29K 2307/04* (2013.01); *B29K 2309/08* (2013.01)

(56) References Cited

U.S. PATENT DOCUMENTS

| | | |
|---|---|---|
| 8,491,988 B2 | 7/2013 | Yamasaki et al. |
| 2004/0201132 A1 | 10/2004 | Okahara et al. |
| 2007/0292669 A1 | 12/2007 | Yamasaki et al. |
| 2012/0308782 A1 | 12/2012 | Yamasaki et al. |

FOREIGN PATENT DOCUMENTS

| | | |
|---|---|---|
| WO | 2012153039 A1 | 6/2012 |
| WO | WO 2012153039 | 11/2012 |

SHIM FOR A COMPRESSION MOLD WITH IMPROVED SEALING

CROSS-REFERENCE TO RELATED APPLICATIONS

This application is the U.S. National Phase application of PCT Application No. PCT/FR2013/053080 filed Dec. 13, 2013, which claims priority to the French application 1262102 filed on Dec. 14, 2012, which applications are incorporated herein by reference and made a part hereof.

BACKGROUND OF THE INVENTION

1. Field of the Invention

This invention relates to the technical field of compression molding for manufacturing thin components, or reinforced plastic shells, from blanks.

A composite material called "SMC", the abbreviation for "sheet molding compound" or "sheet molding composite" is typically used. SMC is particularly suitable for molding large parts.

2. Description of the Related Art

It may be for example a sheet consisting of thermosetting resin, generally of polyester, vinylester or epoxy type, but possibly another type of thermosetting resin, which impregnates for example fibres of glass or of other reinforcement (e.g. with 20% to 30% by weight of reinforcement), often with fillers and/or a catalyst (hardener).

The blank is compression molded under heat and pressure in a closed mold, generally by moving a mobile element of the mold relative to a fixed element of the mold, these elements being typically made of steel.

However, this method has a well-known disadvantage: due to the relative displacement when hot of these various elements, it is difficult to leave a sufficiently low functional clearance between the mobile element and the fixed element of the mold to ensure a seal between these two elements, due in particular to the mold assembly constraints, which involve, in the current state of the art, providing a non-zero assembly clearance at ambient temperature, which also allows the relative movement of the mold elements, without jamming. This assembly clearance remains substantially the same when the mold is heated to the molding temperature, typically about 150° C. The larger the parts to be molded, the greater the clearance.

This results in infiltration of resin between the fixed and mobile elements of the mold during molding, which leads to the presence of burrs on the molded parts, typically in a plane parallel to the mold closing direction, very generally vertical. These burrs, apart from the corresponding loss of material, generate high costs during the subsequent deburring operation, which requires significant time for the operator in charge of this operation.

A proposal has also already been made to produce compression molds comprising mobile sealing parts, or mobile shims, different from the main mobile element of the mold, arranged in one or more housings formed in a fixed element of the mold. This technical option does not solve the problem satisfactorily, however, since these shims must also be assembled with an assembly and operating clearance generating burrs.

SUMMARY OF THE INVENTION

The invention aims to overcome these disadvantages and allow compression molding to manufacture as-molded parts with very limited or no burrs.

To this end, the invention relates in particular to a mobile shim for compression mold for manufacturing a reinforced plastic part by molding under a predetermined maximum molding pressure, the mold comprising a molding element, this mobile shim being displaceable in translation parallel to a mold closing direction, said mobile shim having a molding surface intended to come into continuous contact, during molding, with a molding surface on the molding element, wherein this mobile shim comprises over at least part of its thickness, in a direction perpendicular to the mold closing direction, at least one determined configuration component, said high expansion component comprising one or more high expansion materials, this high expansion material having a mean coefficient of expansion sufficient so that the clearance between the shim and the molding element is zero at least when, during molding, this high expansion component is heated to at least a molding temperature $T_M$ between 115° C. and 170° C., this high expansion material having in addition a mean Young's modulus at the molding temperature $E_{CHD}$, less than 20 000 MPa, and in that the configuration of the high expansion component and the one or more high expansion materials forming this component are selected so that when the shim is assembled in the mold and the high expansion component is heated from an ambient temperature of 23° C. to said molding temperature, the expansion of this component generates at a sealing region between the shim and the molding element a compression stress in a direction perpendicular to the mold closing direction, or increases the compression stress if it exists at ambient temperature, the compression stress being sufficient, when the high expansion component is at the molding temperature, to guarantee sealing during molding between said mobile shim and the molding element, the temperature $T_M$ being considered at a mean level of the sealing region.

The invention can therefore be used to make a satisfactory seal when hot (at the molding temperature).

Two options are possible to implement assembly when cold (typically at ambient temperature or below 50° C.):

Either a non-zero assembly clearance when cold is provided (for example, between about 0.005 mm and about 0.20 mm; In this case, the expansion of the high expansion component made of one or more high expansion materials cancels the initial assembly clearance when cold, and also generates a compression stress when hot (at the molding temperature, between 115° C. and 170° C. and often very close to 150° C.), this stress being sufficient to obtain a satisfactory seal between the molding element and the shim, so that the burrs at the mobile shim/molding element junction are very generally non-existent, or at least very reduced and in this case easy to deburr, thereby leading to considerable savings in time and material.

The one or more high expansion materials and the component configuration are selected to eliminate burrs over substantially the entire mobile shim/molding element junction line.

Either a zero assembly clearance when cold is provided: The mobile shim is then typically assembled with a compression stress when cold, generally relatively low. The assembly can be achieved by compressing the high expansion component during assembly, the shim, typically comprising a chamfer, being introduced under stress in its housing arranged in the molding element. Another possibility is to cool the high expansion component and/or the mobile shim below the temperature of the molding element prior to assembly, or alternatively to preheat the molding element above the temperature of the shim. In this case of assembly with zero clearance, the expansion of the high expansion component (greater than that of the molding element) leads to an increase in the compression stress when hot (at the molding temperature), this stress being sufficient to obtain a satisfactory seal with the molding element.

Another characteristic of the shim according to the invention is the use of a high expansion component made of one or more high expansion materials, and having a mean Young's modulus (or mean modulus of elasticity) of less than 40 000 MPa, and preferably less than 20 000 MPa under the molding conditions. This mean Young's modulus is therefore about 5 times and preferably about 10 times less than that of steel, typically close to substantially 200 000 MPa. This ensures that the shim has considerable elasticity, sufficient to compensate for and absorb manufacturing dimensional variations without generating any risk of jamming between the mobile shim and the molding element.

The term "mean coefficient of expansion" applies in particular when the high expansion component is made from several different high expansion materials. It must be understood as being the coefficient of expansion of a single material which, if the high expansion component was made of this material, would lead to the same expansion of the component.

Similarly, the term "mean Young's modulus" must be understood as being the Young's modulus of a single material which, if the high expansion component was made of this material, would lead to the same elasticity of the component.

The one or more high expansion materials are typically selected and the high expansion component configured in relation with other parameters: thickness of this high expansion component in the shim, mean coefficient of expansion of the molding element (at a given mean level of the sealing region in the mold closing direction, the mold being closed). A high expansion component comprising several layers each made of a different high expansion material may also be used, for example.

Typically, the shim has no specific means for changing its temperature (such as an electric heater, channels for circulating a heating and/or cooling fluid, for example to change and/or control the temperature of the shim). The seal between the mobile shim and the molding element is in fact produced by differential expansion, without the need to change the temperature of the shim by means specific to this shim.

Alternatively, the shim may comprise its own means for changing its temperature, for reasons related to molding, but not to sealing, and in this case, the component of determined configuration, or high expansion component comprises no such means, which are unnecessary for this element.

Preferably, a high expansion component comprising one or more high expansion materials is used, each material comprising a continuous solid phase made of a plastic material, and wherein $E_{CHD}$ is between 900 MPa and 7500 MPa. This imparts high elasticity relative to the shim, to absorb the dimensional variations between the shim and its housing corresponding to conventional manufacturing tolerances.

Examples of such materials, whose continuous solid phase is typically substantially or mainly organic (i.e. mainly consisting of the elements C, H, O, N, but which may also include heteroatoms of elements such as for example S or F) are provided below.

Typically, the high expansion component is subjected to a compression stress in a direction perpendicular to the mold closing direction of between 4 MPa and 40 MPa, and preferably of between 6 MPa and 25 MPa when this component is heated to the molding temperature. Typically, a compression stress generating only negligible creep of the component material under the molding conditions is selected.

Preferably the mean coefficient of expansion $\lambda_{CHD}$ between 23° C. and 150° C. of the high expansion component is at least 50%, and preferably at least 100% greater than the mean coefficient of expansion $\lambda_{EM}$ of the molding element at the mean level of the sealing region. This coefficient can be measured in a plane perpendicular to the mold closing direction, at a mean level of the sealing region on the molding element (half-sum of the highest and lowest levels in this sealing region in the mold closing direction).

The term "clearance" must be understood as being the mean distance between a mobile shim and the molding element, at the sealing region. This clearance, zero at the molding temperature, may be non-zero at other lower temperatures.

The term "coefficient of expansion" is sometimes called the Coefficient of Linear Thermal Expansion (CLTE) of the solid material considered.

Typically, the molding surface of the molding element is formed on a steel substrate comprising at least 70% iron, and the mean coefficient of expansion $\lambda_{CHD}$ of the high expansion component between 23° C. and 150° C. is between $22 \times 10^{-6}$ et $120 \times 10^{-6}$ m/(m.K).

Advantageously, the high expansion component extends over a constant thickness Ep in a direction perpendicular to the mold closing direction, such that:

$$0.02 \times 10^{-3} < Ep(\lambda_{CHD} - \lambda_{EM}) \times 127 < 0.25 \times 10^{-3}; \text{preferably:}$$

$$0.05 \times 10^{-3} < Ep(\lambda_{CHD} - \lambda_{EM}) \times 127 < 0.20 \times 10^{-3}, \text{ and very preferably:}$$

$$0.08 \times 10^{-3} < Ep(\lambda_{CHD} - \lambda_{EM}) \times 127 < 0.12 \times 10^{-3}.$$

The term $(\lambda_{CHD} - \lambda_{EM})$ is representative of a differential coefficient of expansion between the high expansion component and the molding element. The number 127 corresponds to the difference in temperature between 150° C. and 23° C. Note, however, that the temperature of the high expansion component may be slightly different from that of the molding element. Similarly, the temperature may vary very slightly inside the high expansion component or inside the molding element. In this case, we consider the mean temperature at a mean level of the sealing region.

The height of the sealing region is generally between 20 mm and 60 mm, and preferably between 25 mm and 50 mm in the mold closing direction.

The height of the component is generally between 40 mm and 120 mm in the mold closing direction, and preferably between 50 mm and 110 mm.

Preferably, the height of the component is greater than that of the sealing region, preferably at least 1.5 times greater than this height, for example between 1.7 and 5 times this height. This arrangement is especially useful when the component is not in direct contact with the molding element, direct contact being made for example by a steel element. In this case, a moderate compression stress can be used on the component, less than a significant creep stress of the high expansion material, while exerting a high stress at the sealing region between the shim and the molding element.

Preferably, said high expansion component comprises at least 65% by weight, preferably at least 90% by weight, and very preferably 100% by weight of one or more polymers from the group consisting of polyetheretherketone, known as PEEK, polyimide, known as PI, polyamide-imide, known as PAI, and polyphenylene sulphide, known as PPS. These materials are in fact technical plastics having both a very high mean coefficient of expansion with respect to steel and very good mechanical properties at temperatures close to 150° C.

The Young's modulus of these high expansion materials is typically much less than 10 000 MPa, and typically much less than that of steel, imparting high elasticity to the shim/molding element assembly.

Very preferably, said high expansion component comprises at least 65% by weight, preferably at least 90% by weight, and preferably 100% by weight of PEEK and/or PAI, these plastic materials having both a very high mean coefficient of expansion with respect to steel and excellent mechanical properties at temperatures close to 150° C.

Generally, a single layer of a high expansion material, or several different layers of high expansion materials, can be used to make the high expansion component.

The high expansion component typically comprises an assembly clearance at ambient temperature, in the mold closing direction, allowing the high expansion material to expand in this direction at the molding temperature.

The ambient temperature can be conventionally defined as being equal to 23° C. Assembly may however also be carried out at different temperatures and/or with different temperatures for the mobile shim and the molding element.

The shim, or an end part of the shim, may include the high expansion component throughout its entire thickness. The thickness of a shim or shim part corresponds in this case to the minimum thickness of the shim or shim part in a direction perpendicular to the mold closing direction (typically the minimum thickness between two flat faces of this shim or shim part, parallel to the mold closing direction.

Advantageously, however, the shim comprises over at least part of its thickness (which may apply to only part of the shim, for example an upper end) in a direction perpendicular to the mold closing direction, a first part made of a material of hardness greater than that of any material in the high expansion component, and a second part made of the high expansion component, the first part comprising the molding surface of the mobile shim, while the second part does not comprise a molding surface.

Preferably, the shim also comprises a third part made of a material of hardness greater than that of any material in the high expansion component, the second part being sandwiched between the first part and the third part.

Consequently, the first part of the shim, typically made of steel, is in sliding contact with the molding element, also typically made of steel, and with the product to be molded which may have highly abrasive or highly chemically aggressive characteristics. The second part of the shim, comprising the component with the most fragile high expansion material, is therefore protected from these harsh operating conditions. With the presence of the third part, the relatively fragile second part is no longer subjected at all to the mechanical frictional stresses during displacement of the mobile shim.

The invention also relates to a compression mold for manufacturing a reinforced plastic part by molding under a predetermined maximum molding pressure, comprising a molding element, wherein it comprises at least one mobile shim as previously defined.

Typically, the clearance between the shim and the molding element at the ambient temperature of 23° C. lies in the range [0 mm; 0.2 mm].

Advantageously, the force exerted by the shim on the molding element at the sealing region, when the molding element is heated to the molding temperature, is equal to at least 6 times, and preferably at least 10 times the force exerted on the shim by the pressure of a molding material on the molding surface (36) on the shim, at the predetermined maximum molding pressure, typically between 8 MPa and 25 MPa.

Preferably, all the mobile shims of the mold comprise a high expansion component through at least part of their thickness. Consequently, the molding surface of the molding element is delimited and surrounded at its periphery by a molding surface formed by the union of a plurality of elementary molding surfaces each formed by the molding surface of a mobile shim, each of the mobile shims being as previously defined.

This typically eliminates burrs at all junctions between the mobile shims and the molding element.

The invention also relates to a compression molding method wherein a mold as previously described is used.

Typically the method comprises at least the following steps: assembling the mold at one or more temperatures less than 50° C., each mobile shim being inserted into a housing formed in the molding element, preheating the mold to a molding temperature greater than 110° C., for example between 115° C. and 170° C., molding at least one part at a molding temperature, demolding the part at a demolding temperature greater than 115° C., and preferably greater than or equal to 95% of the molding temperature, in particular by opening the mold and displacing each of the mobile shims, preferably to place them in a molding start position, without each of these mobile shims coming completely out of its housing, molding at least one other part without cooling the mold below 115° C.

This method allows the mold to be assembled at ambient temperature or at a temperature less than 50° C., with a non-zero functional assembly clearance, for example between 0.005 mm and 0.2 mm, then to obtain zero clearance when hot. It also allows the mold to be assembled directly with a zero assembly clearance at ambient temperature or at a temperature less than 50° C., by taking advantage of the elasticity of the component in the shim.

This elasticity also allows displacement of the shim(s) (repetitive sliding with respect to the molding element) at the molding temperature, due to the fact that the shims do not come out of their housings. Furthermore, this elasticity considerably reduces the risks of jamming.

Finally, the invention relates to a motor vehicle part, for example an opening panel (box, tailgate skin, side door or bonnet liner), a floor, a roof panel, a structural part (roof stiffener, A, B or C pillar, wing bracket, battery tray), a technical front, or a wing, made of a material of the type comprising a thermosetting resin, and a reinforcement, this reinforcement comprising, for example, beads or fibers of a material from the group consisting of glass, carbon, aramid or polyethylene, this part being made by a method comprising a molding step as previously mentioned above, and comprises an outer surface having a surface continuity substantially free of mechanical finish marks made by sanding and/or grinding and/or cutting and/or milling. The absence of angular points (surface discontinuities) avoids local stress concentrations, for example due to vibrations. It also improves the chemical resistance, for example to corrosion, this being further increased in the case of a part coated after molding, such as a painted part. The discontinuities are areas of fragility in the coating.

The surface condition is therefore typically that of an as-molded surface and not that of a mechanically-finished surface.

For a lorry, the part may be a bumper, radiator grille, door extension, footstep, corner panel trim, a boot (for tools or luggage), a roof extension or deflector, a strip.

BRIEF DESCRIPTION OF THE ACCOMPANYING DRAWINGS

The invention will be better understood on reading the accompanying figures, which are given solely by way of example and not limiting in any way, in which.

DETAILED DESCRIPTION OF THE PREFERRED EMBODIMENTS

Figure 1:
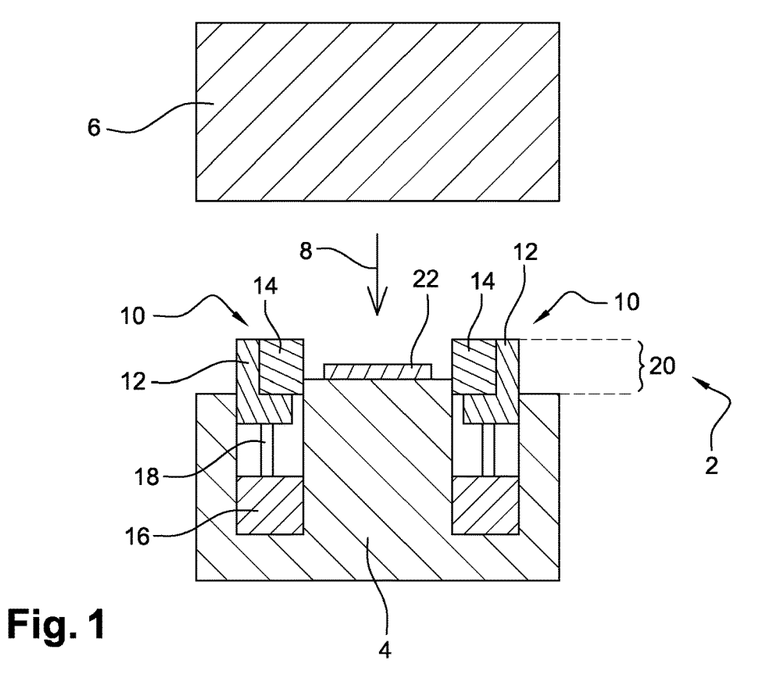
FIG. 1 is a diagrammatic representation of a mold according to a first embodiment of the invention, in open position, seen in cross-section in a plane parallel to the mold closing direction.

We now refer to FIG. 1, which shows a compression mold 2 for manufacturing a reinforced plastic part, the mold 2 being in open position. The mold 2 comprises a fixed molding element 4, and a mobile molding element 6, movable in a closing direction 8 of the mold 2. FIG. 1 also shows two mobile shims 10, arranged in two housings of the molding element 4. In this mold 2 according to a first embodiment of the invention, each mobile shim 10 comprises a steel part 12 and a high expansion component 14 made of a high expansion material, for example semicrystalline PEEK (polyetheretherketone). Each housing of the molding element 4 also comprises at least one ram 16, and typically a plurality of rams, for moving by means of at least one ram rod 18 the mobile shim 10 arranged in this housing. The ram(s) 16 and ram rod(s) 18 are not considered as parts of the mobile shim 10, but as means for moving this shim.

The upper part 20 of each mobile shim 10 therefore comprises a steel thickness, belonging to the part 12 of the shim 10, and a thickness made of PEEK, a high thermal expansion material, forming the high expansion component 14.

Lastly, FIG. 1 shows a molding blank 22 made from SMC composite material.

When assembling the mobile shim 10 when cold, for example at a conventional ambient temperature of 23° C., the mobile shim 10 is inserted into its housing of the molding element 4 thanks to a functional assembly clearance, for example 0.1 mm.

As a variant, a shim 10 assembled with zero clearance can be used, for example by cooling the shim 10 to 5° C. and/or by preheating if necessary the molding element 4, for example to 45° C. In this case, a slight compression stress can be implemented in the material of the high expansion component 14, and between the shim 10 and the molding element 4 if, or when, the shim 10 and the mold 2 return to a uniform ambient temperature of 23° C.

When heating the entire mold 2 to reach the molding temperature, close to 150° C., the upper part 20 of the shim 10 expands more than the steel housing of the molding element 4, since the high expansion component 14 is made of PEEK, a material whose coefficient of expansion is very high compared with that of steel. As a result, the clearance between the mobile shim 10 and the molding element 4 at the upper part 20 of this mobile shim 10 is reduced or, in case of zero initial clearance, the shim compression increases.

The PEEK thickness is advantageously calculated so that at the molding temperature, the clearance between the shim 10 and the molding element 4 is zero, and so that the force exerted by the shim 10 on the molding element 4 is 10 times greater than the pressure force exerted on the shim 10 by the molding material, at the maximum molding pressure.

Very generally, the thickness of the high expansion material(s) forming the high expansion component 14 is adapted to obtain the required compression stress on the shim 10. The thickness of the high expansion material(s) may vary typically between 8 mm and 60 mm, and preferably between 12 mm and 40 mm.

For example, as regards the expansion between the ambient temperature and the molding temperature, it is possible to have a shim 10 assembled with zero clearance, a substantially zero compression, a theoretical expansion of the mobile shim 10 of 0.24 mm (across the thickness), an expansion of the shim housing of 0.1 mm, and therefore a shim compression corresponding to a thickness reduction of 0.14 mm, absorbed by the PEEK.

In FIG. 1 and the following figures, the mean plane of the SMC part and of the corresponding molding surfaces is shown perpendicular to the mold closing direction 8. This is not mandatory, however, and the invention may also be implemented with one or more oblique shims, the mean plane of the molded part forming an acute, or obtuse, angle with the mold closing direction 8.

Figure 2:
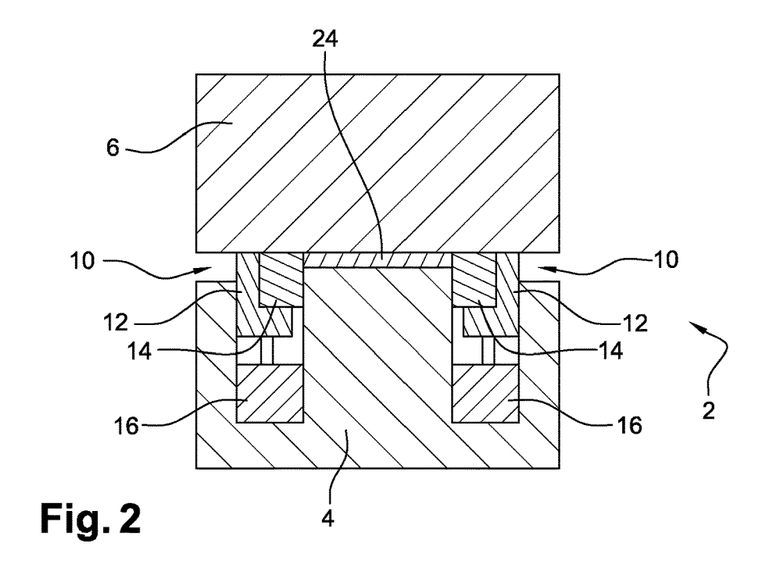
FIG. 2 shows the mold of FIG. 1, in closed position.

We now refer to FIG. 2, which shows the same mold 2 as that of FIG. 1 but in closed position, after molding. The mobile molding element 6 is displaced with respect to its position on FIG. 1, to rest against and displace the mobile shims 10 downwards, and form in compression the SMC blank to obtain the SMC molded part 24. Due to the high expansion of each PEEK high expansion component 14, the clearance, at least at the molding temperature, is zero between the high expansion component 14 of the shim 10 and the molding element 4. In addition, the shim 10 exerts a compressive force on the molding element 4, sufficient to provide a seal between these two elements. Consequently, there are no more burrs, or virtually no more burrs on the as-molded part 24 between the high expansion component 14 of the shim 10 and the molding element 4.

Figure 3:
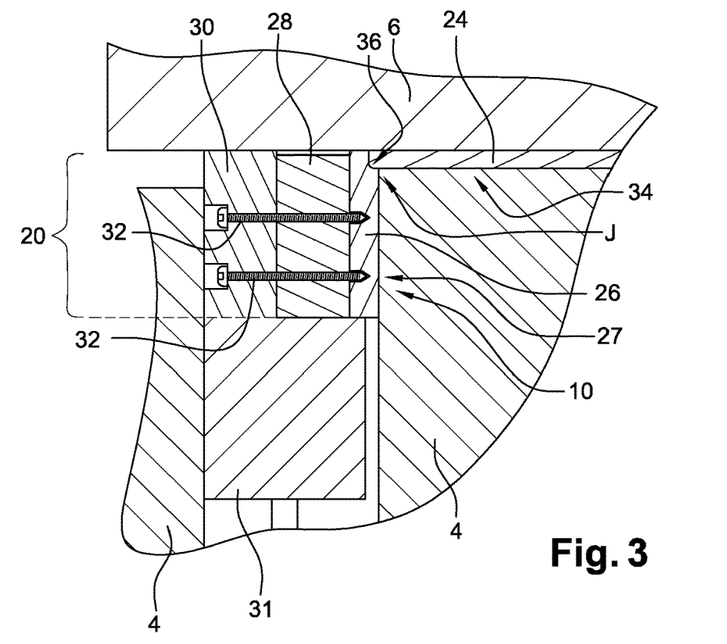
FIG. 3 shows a part of a mold according to a second embodiment of the invention, seen in cross-section in a plane parallel to a mold closing direction.

We now refer to FIG. 3, which shows a part of a mold 2 according to a second embodiment of the invention, after molding. In this second embodiment of the invention, the mobile shim 10 comprises an upper part 20, composed of three parts, and superimposed thicknesses:

a first steel part 26, in sealed contact at the molding temperature with the molding element 4 at a sealing region 27 which extends over the part of the height of the first part 26 which is in contact with the molding element 4. In particular, there is sealed contact at the junction point J on FIG. 3, corresponding to a junction line between the shim molding surfaces and the molding element 4;

a second part 28 formed by a PEEK high expansion component (or by a stack of several high expansion materials); and a third steel part 30 (extending in the upper part 20 of the mobile shim 10).

The shim 10 also comprises a lower steel part 31, integral with the third part 30.

These three parts 26, 28, and 30 are assembled by screws 32, the second PEEK part 28 being sandwiched between the first and third parts 26 and 30. Consequently, the PEEK high expansion component, which is mechanically more fragile than steel, is not subject to any frictional stresses during translational displacement of the mobile shim 10. Furthermore, it is not in contact with the product to be molded, which forms the molded part 24, this product possibly being abrasive or having high chemical reactivity.

The screws 32 are typically assembled when cold with a clearance allowing subsequent differential expansion, at the second part 28, between the PEEK of this second part 28 and the material of the screws, typically steel. This clearance may also be calibrated using spring washers, such as Belleville washers, which will be assembled with low or zero stress, and placed under stress when hot due to the expansion of the PEEK.

In other embodiments, the screw head may be in the high expansion material, with the thread remaining in a steel part.

FIG. 3 also shows the molding surface 34 on the molding element 4 and the molding surface 36 on the mobile shim 10. Due to the seal obtained when hot, these two molding surfaces 34, 36 are in continuous contact, producing a seal during molding, such that no burrs are formed along the junction line corresponding to the junction point J on FIG. 3.

The mold of FIG. 3 comprises four mobile shims as previously described (only one shown) 10, each one comprising a molding surface 36, the four molding surfaces 36 forming together a single molding surface surrounding the molding surface 34 of the element 4. Two adjacent mobile shims are typically perpendicular to each other, two opposite shims being parallel to each other.

Figure 4:
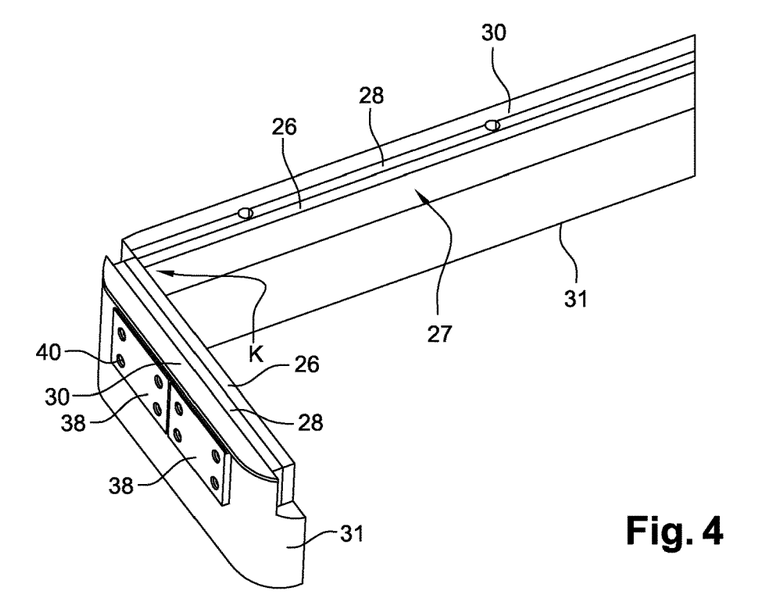
FIG. 4 shows in perspective two adjacent mobile shims of the same mound according to the invention.

We now refer to FIG. 4, which shows two adjacent mobile shims 31 of the type previously described, each comprising an upper part having a second part formed by a PEEK high expansion component 28, sandwiched between the first and third steel parts 26 and 30. Each first part 26 of a mobile shim 31 is in contact with the first part 26 of the adjacent mobile shim 31, providing a good seal at the corner K. More precisely, at a corner K between two adjacent mobile shims 31, the edge of a first part 26 is in contact with the flank of the other first part 26.

In the embodiment of FIG. 4, each shim 31 also comprises clamping plates 38, arranged in a recess of the part 30, each plate 38 comprising holes 40 for clamping screws.

The invention is not limited to the embodiments described and other embodiments will be clearly apparent to those skilled in the art. In particular it is possible to use jointly or as a substitute for the technical characteristics outlined above, any technical characteristic known in the state of the art, provided that there is no incompatibility with the implementation of the invention. In particular, high expansion materials other than PEEK may be used for the implementation of the invention.

What is claimed is:

1. A mobile shim for compression mold for manufacturing a reinforced plastic part by molding under a predetermined maximum molding pressure, said mold comprising a molding element, said mobile shim being displaceable in translation parallel to a mold closing direction, said mobile shim having a molding surface intended to come into continuous contact, during molding, with a molding surface on said molding element, wherein said mobile shim comprises over at least part of its thickness, in a direction perpendicular to said mold closing direction, at least one high expansion component of determined configuration, said high expansion component comprising at least one or more high expansion materials, said at least one high expansion material having a mean coefficient of expansion sufficient to cause said at least one high expansion component to expand during molding so that a clearance between said shim and said molding element is zero at least when, during said molding, said at least one high expansion component is heated to at least a molding temperature $T_M$ between 115° C. and 170° C., said at least one high expansion component having in addition a mean Young's modulus at the molding temperature $E_{CHD}$, less than 20 000 MPa, a configuration of said at least one high expansion component and the one or more high expansion materials forming said at least one high expansion component are selected so that when said shim is assembled in said mold and during molding, said at least one high expansion component is heated from an ambient temperature of at least 23° C. to said molding temperature, the expansion of said at least one high expansion component generates at a sealing region between said shim and said molding element a compression stress in a direction perpendicular to said mold closing direction, or increases said compression stress if it exists at ambient temperature, said compression stress being sufficient, when said at least one high expansion component is at said molding temperature, to guarantee sealing during molding between said mobile shim and said molding element, the temperature $T_M$ being considered at a mean level of this sealing region;

wherein the mean coefficient of expansion $\lambda_{CHD}$ between 23° C. and 150° C. of said high expansion material is at least 50% greater than the mean coefficient of expansion $\lambda_{EM}$ of said molding element at said mean level of said sealing region.

2. The shim according to claim 1, wherein said at least one high expansion component comprises one or more high expansion materials each comprising a continuous solid phase made of a plastic material, and wherein $E_{CHD}$ is between 900 MPa and 7500 MPa.

3. The shim according to claim 1, wherein said at least one high expansion component is subjected to said compression stress in a direction perpendicular to said mold closing direction of between 4 MPa and 40 MPa when said at least one high expansion component is heated to said molding temperature.

4. The shim according to claim 1, wherein the shim is not provided with structural means for changing its temperature.

5. The shim according to claim 1, wherein said molding surface of said molding element is formed on a steel substrate comprising at least 70% by weight of iron, and the mean coefficient of expansion $\lambda_{CHD}$ of said high expansion component between 23° C. and 150° C. is between $22 \times 10^{-6}$ et $120 \times 10^{-6}$ m/(m.K).

6. The shim according to claim 1, wherein said at least one high expansion component extends over a constant thickness Ep in a direction perpendicular to said mold closing direction, such that $0.02 \times 10^{-3} < \text{Ep}\ (\lambda_{CHD} - \lambda_{EM}) \times 127 < 0.25 \times 10^{-3}$.

7. The shim according to claim 1, wherein the height of said sealing region is between 20 mm and 60 mm in said mold closing direction.

8. The shim according to claim 1, wherein the height of said at least one high expansion component is between 40 mm and 120 mm in said mold closing direction.

9. The shim according to claim 1, wherein said at least one high expansion component comprises at least 65% by weight of one or more polymers from the group consisting of polyetheretherketone, known as PEEK, polyimide, known as PI, polyamide-imide, known as PAI, and polyphenylene sulphide, known as PPS.

10. The shim according to claim 9, wherein said at least one high expansion component comprises at least 65% by weight of PEEK and/or PAI.

11. The shim according to claim 1, wherein said shim comprises, over at least part of its thickness in a direction perpendicular to said mold closing direction, a first part made of a material of hardness greater than that of any material in said at least one high expansion component, and a second part formed by said at least one high expansion component, said first part comprising said molding surface of said mobile shim, while said second part comprises no molding surface.

12. The shim according to claim 11, wherein said at least part of said shim also comprises a third part made of a material of hardness greater than that of any material in said at least one high expansion component, said second part being sandwiched between said first part and said third part.

13. A compression mold for manufacturing a reinforced plastic part by molding under a predetermined maximum molding pressure, comprising a molding element, wherein it comprises at least one mobile shim according to claim 1.

14. The compression mold according to claim 13, wherein the clearance between said shim and said molding element at the ambient temperature of 23° C. lies in the range [0 mm; 0.2 mm].

15. The compression mold according to claim 13, wherein the force exerted by said shim on said molding element at said sealing region, when said molding element is heated to said molding temperature, is equal to at least 6 times the force exerted on said shim by the pressure of a molding material on said molding surface of said shim, at the predetermined maximum molding pressure.

16. The mold according to claim 13, comprising a plurality of mobile shims, wherein said molding surface on said molding element is delimited and surrounded at its periphery by a molding surface formed by the union of a plurality of elementary molding surfaces each formed by said molding surface of said mobile shim, each of said mobile shims being displaceable in translation parallel to a mold closing direction, said mobile shim having a molding surface intended to come into continuous contact, during molding, with a molding surface on said molding element, wherein said mobile shim comprises over at least part of its thickness, in a direction perpendicular to said mold closing direction, at least one high expansion component of determined configuration, said high expansion component comprising at least one or more high expansion materials, said at least one high expansion material having a mean coefficient of expansion sufficient so that the clearance between said shim and said molding element is zero at least when, during molding, said at least one high expansion component is heated to at least a molding temperature $T_M$ between 115° C. and 170° C., said at least one high expansion component having in addition a mean Young's modulus at the molding temperature $E_{CHD}$, less than 20 000 MPa, a configuration of said at least one high expansion component and the one or more high expansion materials forming said at least one high expansion component are selected so that when said shim is assembled in said mold and during molding, said at least one high expansion component is heated from an ambient temperature of at least 23° C. to said molding temperature, the expansion of said at least one high expansion component generates at a sealing region between said shim and said molding element a compression stress in a direction perpendicular to said mold closing direction, or increases said compression stress if it exists at ambient temperature, said compression stress being sufficient, when said at least one high expansion component is at said molding temperature, to guarantee sealing during molding between said mobile shim and said molding element, the temperature $T_M$ being considered at a mean level of this sealing region.

17. A compression molding method wherein a mold according to claim 13 is used.

18. The compression molding method according to claim 17, comprising at least the following steps:
assembling said mold at one or more temperatures less than 50° C., each mobile shim being inserted into a housing formed in the molding element;
preheating said mold to a molding temperature greater than 110° C., for example between 115° C. and 170° C.;
molding at least one part at a molding temperature;
demolding the part at a demolding temperature greater than 115° C., and preferably greater than or equal to 95% of said molding temperature, in particular by opening said mold and displacing each of the mobile shims, preferably to place them in a molding start position, without each of said mobile shims coming completely out of its housing; and
molding at least one other part without cooling the mound below 115° C.

19. A mobile shim according to claim 1 wherein ambient temperature is about 23° C.

20. The shim according to claim 1, wherein said at least one high expansion component is subjected to said compression stress in a direction perpendicular to said mold closing direction of between 6 MPa and 25 MPa when said at least one high expansion component is heated to said molding temperature.

21. The shim according to claim 1, wherein the mean coefficient of expansion $\lambda_{CHD}$ between 23° C. and 150° C. of said high expansion material is at least 100% greater than the mean coefficient of expansion $\lambda_{EM}$ of said molding element at said mean level of said sealing region.

22. The shim according to claim 1, wherein said at least one high expansion component comprises at least 90% by weight of one or more polymers from the group consisting of polyetheretherketone, known as PEEK, polyimide, known as PI, polyamide-imide, known as PAI, and polyphenylene sulphide, known as PPS.

23. The shim according to claim 9, wherein said at least one high expansion component comprises at least 90% by weight, of PEEK and/or PAI.

24. The compression mold according to claim 13, wherein the force exerted by said shim on said molding element at said sealing region, when said molding element is heated to said molding temperature, is equal to at least 10 times the force exerted on said shim by the pressure of a molding material on said molding surface of said shim, at the predetermined maximum molding pressure.

\* \* \* \* \*

UNITED STATES PATENT AND TRADEMARK OFFICE
CERTIFICATE OF CORRECTION

PATENT NO. : 10,406,728 B2
APPLICATION NO. : 14/651339
DATED : September 10, 2019
INVENTOR(S) : Arnaud et al.

Page 1 of 1

It is certified that error appears in the above-identified patent and that said Letters Patent is hereby corrected as shown below:

On the Title Page

(71) Applicant, delete "Lyons" and insert --Lyon-- therefor.

(73) Assignee, delete "Lyons" and insert --Lyon-- therefor.

(56) Foreign Patent Documents (Continued page 2), delete "WO 2012153039 A1 6/2012" and insert --WO 2012153039 A1 11/2012--.

Signed and Sealed this
Twenty-second Day of October, 2019

Andrei Iancu
*Director of the United States Patent and Trademark Office*